United States Patent

Ozouf et al.

[11] Patent Number: 5,276,317
[45] Date of Patent: Jan. 4, 1994

[54] DEVICE FOR HOUSING A SMART CARD

[75] Inventors: René Ozouf, Le Bourget; Jean-Michel Seguin, Asnieres s/Seine, both of France

[73] Assignee: Societe Anonyme Dite: Alcatel Radiotelephone

[21] Appl. No.: 739,543

[22] Filed: Aug. 2, 1991

[30] Foreign Application Priority Data

Aug. 3, 1990 [FR] France ................. 90 09980

[51] Int. Cl.$^5$ ................ G06K 7/00; G06K 7/06
[52] U.S. Cl. .................... 235/486; 361/748; 361/752; 439/260; 439/59; 364/708.1; 235/441
[58] Field of Search .............. 235/441, 486; 439/260, 439/59; 361/395, 399; 364/708; 365/52

[56] References Cited

U.S. PATENT DOCUMENTS

| 3,883,856 | 5/1975 | Saito et al. | 235/441 |
|---|---|---|---|
| 4,441,140 | 4/1984 | Richard | 361/399 |
| 4,489,351 | 12/1984 | d'Alayer de Costemore d'Arc | 358/213 |
| 4,630,769 | 12/1986 | Ball | 232/1 D |
| 4,700,840 | 10/1987 | Haddock | 235/487 |
| 4,843,223 | 6/1989 | Shino | 235/487 |
| 4,870,604 | 9/1989 | Tatsuno | 235/380 |
| 4,926,034 | 5/1990 | Banjo et al. | 235/441 |
| 5,055,970 | 10/1991 | Weihs | 235/486 |
| 5,161,169 | 11/1992 | Galano et al. | 364/708 |

FOREIGN PATENT DOCUMENTS

| 0367325 | 5/1990 | European Pat. Off. | A45C 11/8 |
|---|---|---|---|
| 3642424 | 6/1987 | Fed. Rep. of Germany | G06K 7/04 |
| 2651592 | 3/1991 | France | 235/487 |
| 0054388 | 2/1990 | Japan | 235/486 |
| 2116480 | 9/1983 | United Kingdom | B42D 15/02 |

OTHER PUBLICATIONS

Patent Abstracts of Japan, vol. 10, No. 162 (P-466)(2218), Jun. 10, 1986; & JP-A-61015289 (Mitsubishi Jushi K.K.), Jan. 23, 1986.
Patent Abstracts of Japan, vol. 10, No. 22 (P-424)(2079), Jan. 28, 1986; & JP-A-60173789 (Nippon Denshin Denwa Kosha), Sep. 7, 1985.

Primary Examiner—Donald Hajec
Assistant Examiner—Esther H. Chin
Attorney, Agent, or Firm—Sughrue, Mion, Zinn, Macpeak & Seas

[57] ABSTRACT

A device for housing a smart card is provided which consists of a compartment for receiving the card and a support onto which the card is secured, the device further including elements that allow the support to be temporarily fixed onto the receiving compartment, the receiving compartment being part of an item of electronic equipment or a storage wallet.

7 Claims, 3 Drawing Sheets

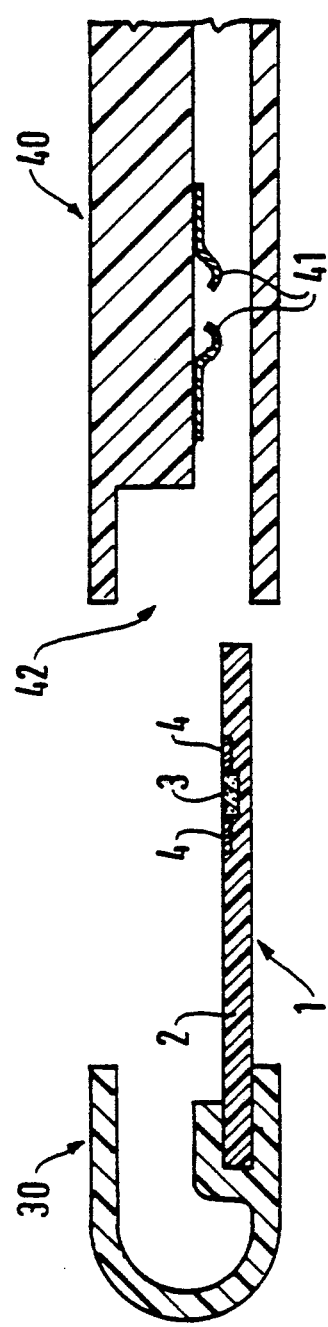
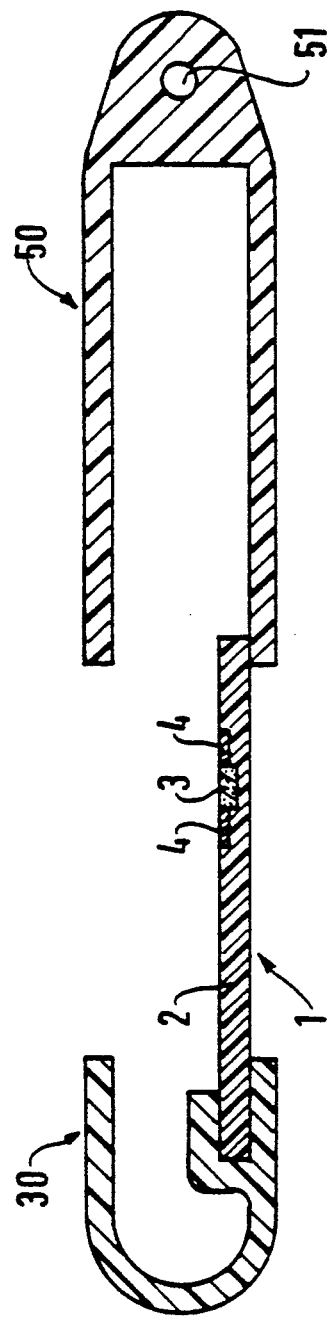
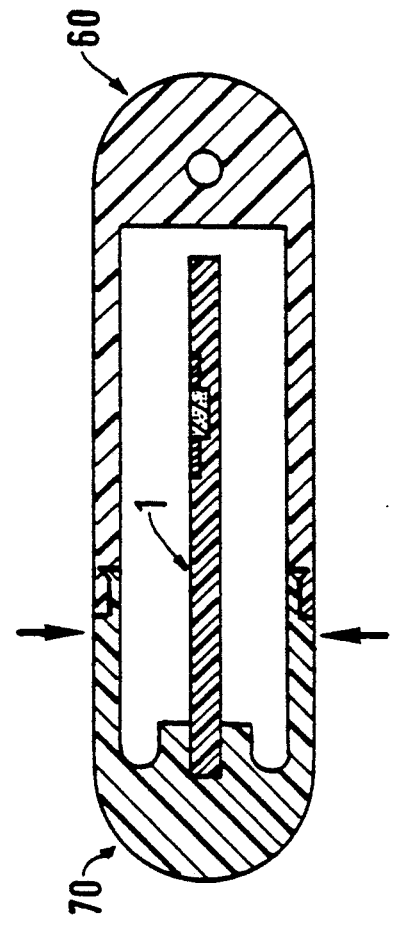
FIG. 4
FIG. 5
FIG. 6

DEVICE FOR HOUSING A SMART CARD

BACKGROUND OF THE INVENTION

The present invention relates to the field of cards that incorporate a memory frequently known as smart cards or chip cards.

Numerous devices currently operate with such cards or are intended to be able to operate with them. The cards consist of a rectangular plate in a plastic material incorporating an integrated circuit which is more or less complex but which at the minimum includes a memory and a logic circuit. The dimensions of the plastic rectangle are standardized (length: 85.6 mm, width: 53.98 mm, thickness: 0.76 mm). The dimensions of the integrated circuit with its contact pads are much smaller than the dimensions of the rectangle.

Such cards, referred to hereinafter as "smart cards" have to date been used in association with items of apparatus that are relatively voluminous compared to the size of the cards (consider, for example, telephone cards used with public telephones). The size of the standardized card does not present any problem with this type of apparatus. It is moreover particularly well-suited to being handled by the user, and it can readily be stored in a pocket or a wallet.

Moreover, in the telephone field a new product in the form of portable radio telephones has appeared on the scene. These items of equipment which were fairly voluminous originally are now appearing with much smaller dimensions. Parallel to this and for various reasons (access control, charge metering), an idea is to make them operate with a smart card which should be able to be readily introduced and withdrawn from the equipment. Miniaturization of portable radio telephones has now arrived at such a stage that the conventional smart card is too big for the equipment especially if account is taken of the fact that the latter must include some device for housing the card to ensure normal operation.

As the integrated circuit with its contact pad only occupies a restricted area, reducing the size of the card does not per se create any problems. Thus, reducing the dimensions of smart cards enables them to be used and integrated into products having reduced dimensions while still keeping the cards protected from the outside environment. A smart card of reduced dimensions however leads to difficulties regarding the possibility of withdrawing it from the product to which it is assigned. Moreover, the card needs to be handled and transported when it is withdrawn from the product that receives it. Its extraction and insertion should not reduce its operating capacity and positioning of the card needs to be unambiguous.

When the card is withdrawn from the user equipment it further needs to be protected from the effects of the outside environment. Its small size should not increase its chances of being lost. The invention sets out to overcome these disadvantages.

SUMMARY OF THE INVENTION

The invention consists in a device for housing a smart card which can adopt the form of a fixed part when the card is associated with a user product, allowing various information to be read and written. The housing device can also take the form of a mobile part that receives the smart card and enables it to be retained, positioned, extracted, transported and protected in an integrated fashion.

The invention hence provides a housing device for a memory or smart card comprising a compartment for receiving the card and a support onto which the card is fixed, the device including means enabling the support to be temporarily mounted on the receiving compartment.

The receiving compartment is constituted, in the case where the card is in use, by part of an apparatus that includes at least one electronic circuit adapted to operate in relation with the smart card, said compartment including electrical connection means between the contacts of the card and the said electronic circuit.

The receiving compartment is constituted by a wallet when the smart card is being stored.

The support can consist of a flat part onto which the smart card is fixed by means of one of its major sides.

The support can also, in another embodiment, be constituted by a part that is rigidly fixed to the smart card at one of the ends thereof.

The invention will be more readily understood and its advantages will become more clear from the description which follows provided by way of non-limiting examples in association with the attached drawings.

BRIEF DESCRIPTION OF THE DRAWINGS

In the drawings:

FIG. 4 is a sectional view in accordance with a second embodiment of a device for housing a smart card for actual use of the card.

FIGS. 5 and 6 are sectional views in accordance with the second embodiment of the invention of devices for housing a smart card for enabling the card to be stored.

DETAILED DESCRIPTION OF PREFERRED EMBODIMENTS

Figure 1:
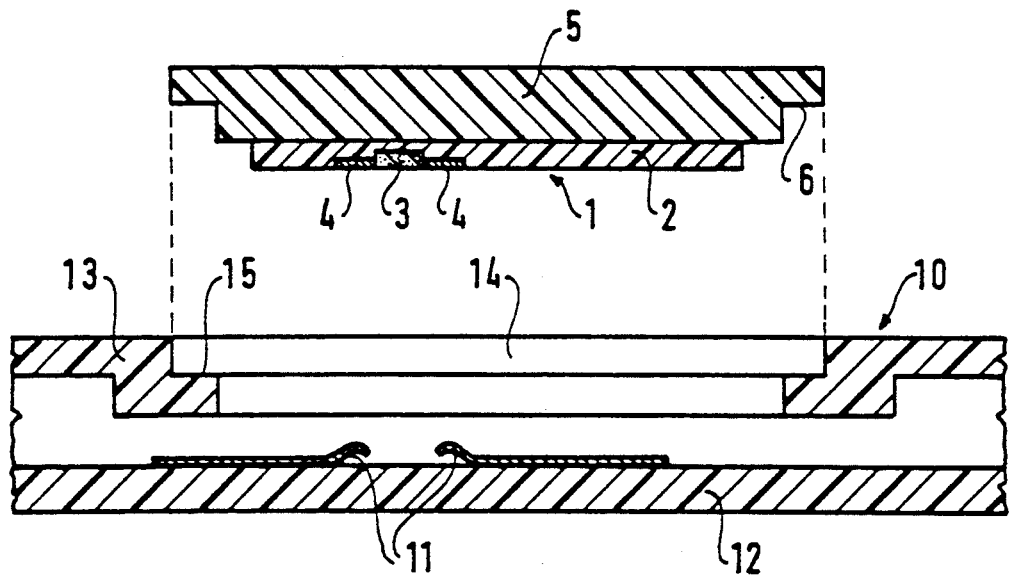
FIG. 1 is a sectional view in accordance with a first embodiment of a device for housing a smart card for actual use of the card.

According to FIG. 1, the smart card 1 consists of a plastic rectangular plate 2 supporting an integrated circuit 3 and contact pads 4 on one face of the plate only two of which have been shown. The plastic rectangular plate has reduced dimensions, for example 25 mm × 15 mm. It is secured onto a support 5, for example by bonding. For actual use of the card, the receiving compartment 10 constitutes a part of an item of equipment incorporating one or several electronic circuits. This piece of equipment can be a portable radiotelephone. The receiving compartment 10 includes deflectable resilient contacts 11 provided at the base 12 of the compartment. The forward side 13 of the compartment includes a stepped opening 14 for enabling the smart card 1 to be introduced. The forward face 13 also includes, at the periphery of opening 14, an internal flange 15 the shape of which corresponds to a recess 6 formed at the periphery of support 5.

Figure 2:
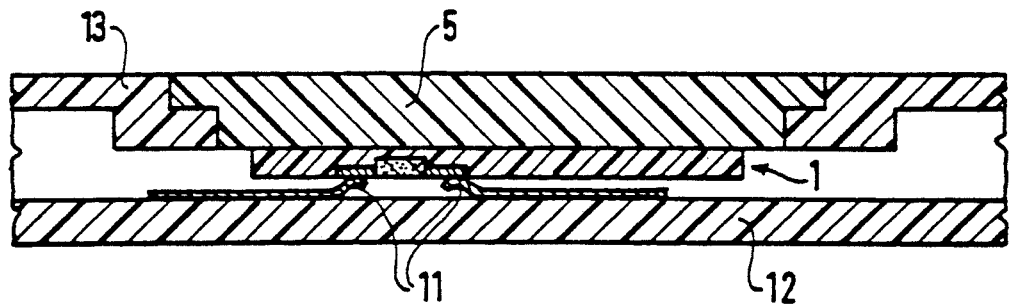
FIG. 2 is a sectional view of the housing device in FIG. 1 in the closed position.

When the smart card and its support are arranged on the receiving compartment as illustrated in FIG. 2, the contact pads 4 of integrated circuit 3 are linked electrically to the movable contacts 11 of the receiving compartment.

The support 5 as well as the receiving compartment 10 can be provided in plastics material These parts can be readily designed so that their respective dimensions ensure that mounting can take place without clearance. The provision of a polarizing key to avoid incorrect mounting is advantageous.

Figure 3:
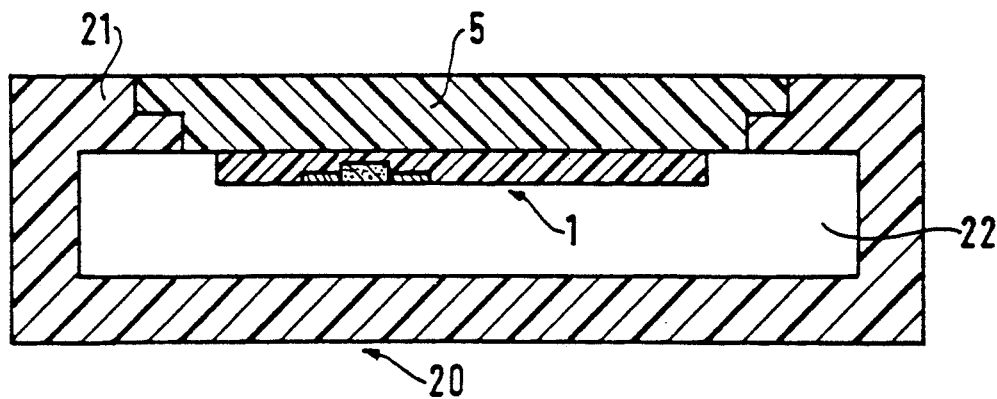
FIG. 3 is a sectional view in accordance with a first embodiment of the invention of a housing device for a smart card for storing the card.

FIG. 3 shows the smart card in its stored position. The housing device consists of a wallet-like holder 20 the forward side 21 of which is similar to the forward side 13 of receiving compartment 10. The wallet-like holder 20 can also be provided in a plastics material. Fitting of support 5 onto the forward side of the wallet-like holder 20 ensures that the latter is closed and that the space inside it, 22, isolated. The smart card 1 is thus protected from the outside environment.

The shape of the support enables it to be fitted, positioned, and retained in the item of equipment. It guarantees the relative positioning of the integrated circuit (more commonly known as a chip) fitted in the card with respect to the contacts that are an integral part of the item of equipment. The card's support ensures it is protected from the outside environment.

Up until now, the smart card and its support have been described as two separate elements that have been securely fastened together. This is the result of current methods and manufacturing practice. It is perfectly feasible to provide a single product that plays the part of the support and onto which the integrated circuit would be directly incorporated.

In the embodiment shown in FIG. 4, the support consists of an insertable smart card support part 30 which is made integral with the smart card 1 at one of its ends. The receiving compartment 40 fitted with deflectable resilient contacts 41 receives the smart card at an entry side 42. Like in the first embodiment, introduction of the card sets up an electrical linkage between the contact pads 4 of integrated circuit 3 and corresponding deflectable contacts 41. When insertion has been finished, the entry side 42 of the compartment is closed off by the support part 30. The card 2 can be secured to its support by bonding or by clamping it. Here again, a polarizing key can be provided for avoiding incorrect fitting.

FIG. 5 shows the smart card and its support 30 in accordance with the second embodiment associated with a receiving compartment designed to store the card. The housing device consists in this case of a wallet-like holder 50 designed in a fairly similar way to receiving compartment 40 of FIG. 4. The wallet-like holder 50 can include a part enabling it to be connected to some further element to avoid its loss. In FIG. 5 the body of the wallet-like holder includes a hole 51 through which a ring can pass. Thus the wallet-like holder can act as a key-ring, fitted with, or without, a smart card.

Temporary securing of the support onto the receiving compartment can be achieved in different ways. A system using clips or snap-in retainers provides the advantage of ensuring fast opening and closing.

In the case of the first embodiment, temporary securing can be obtained in the same way as battery-operated children's toys in which the battery compartment includes a removable cover.

In the case of the second embodiment, a snap-in fastening arrangement similar to the one shown in FIG. 6 can be used on a U shaped support 70 and a body defining a receiving compartment constituted by a U-shaped wallet-like holder 60. The snap-in elements are for example provided on two facing sides of the wallet-like holder 60. The support 70 is released by pressing sides of the support 70 in the direction of the arrows and by moving the holder 60 axially relative to the support. Fitting together is done by pressing the same sides of the support 70 in the direction of the arrows while bringing the two parts 60, 70 axially together, then releasing the support 70.

Figure 7:
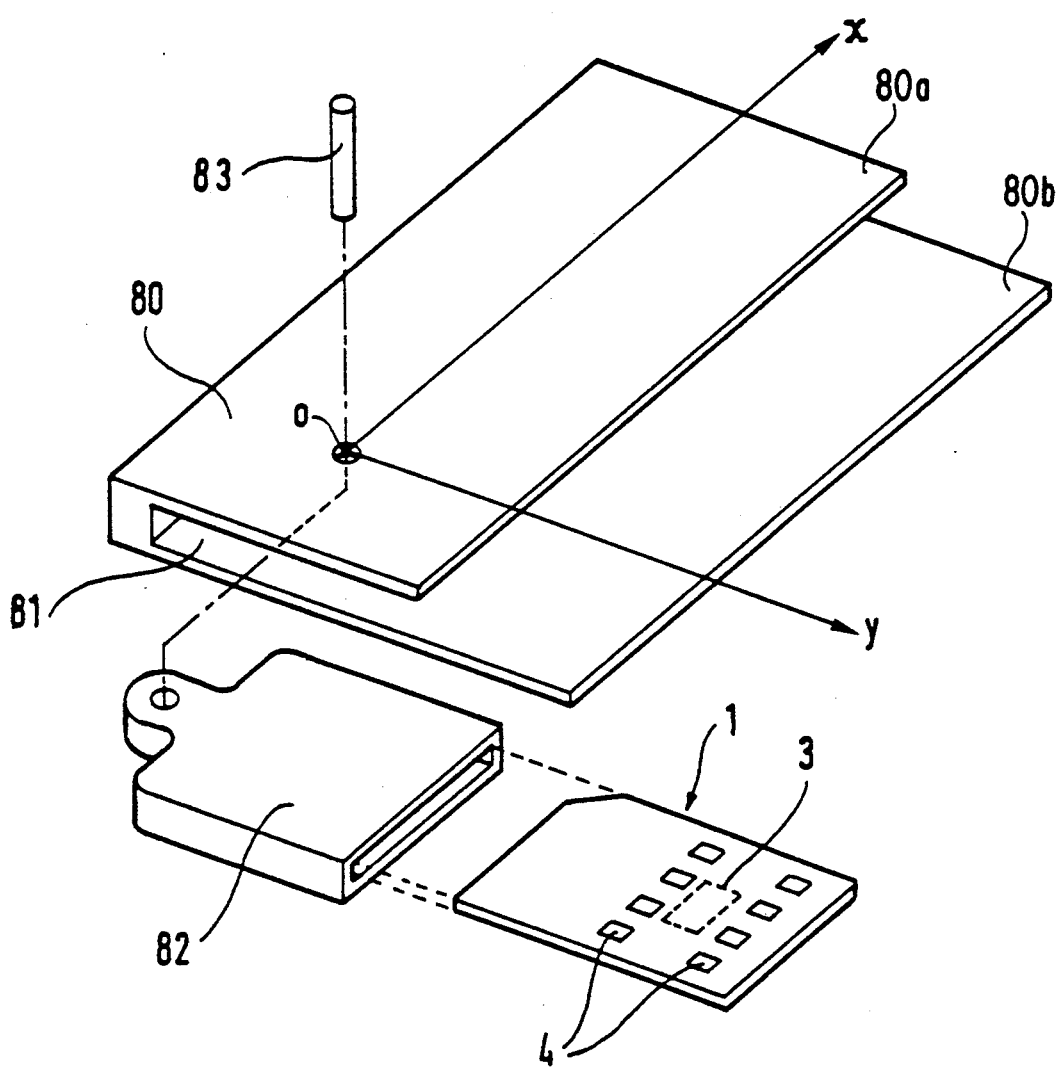
FIG. 7 is an exploded view of a slotted holder with a pivoting smart card.

The receiving compartment for the smart card to enable it to be stored can consist of a slot formed in the card's support. The card can then, by swinging it about the axis of a pivot pin, be made to enter the slot for storage purposes or be extracted from the slot for use. FIG. 7 is an exploded view of such an embodiment. The support 80 has a U-shaped cross-section, one 80a of the arms of which is shorter than the other 80b. The space between the arms constitutes a slot 81 which acts as a receiving compartment for the card 1. The card is retained at one of its ends in the wallet-like holder 82 which can pivot about the axis of pivot pin 83. With the card in the enclosed position, the wallet-like holder 82 and the card 1 are disposed in the direction Ox, one of the lateral sides of the wallet-like holder being optionally provided with a tab, projecting from the slot in order to enable the card to be swung out. With the card extended for the purposes of using it, the wallet-like holder and the card are disposed in the direction Oy, a non-illustrated detent limiting the angle of opening to axis Oy.

What is claimed is:

1. A combination of a housing device and a smart card having contacts, said device comprising a body defining a receiving compartment for receiving said smart card, a support, said card being permanently fixedly mounted to said support, means for temporarily mounting said support to said body with said card inserted within said receiving compartment, said receiving compartment comprising part of an apparatus including at least one electronic circuit adapted to operate in relation with said smart card, and said body defining said receiving compartment including electrical connection means for connecting the contacts of the smart card to said electronic circuit upon mounting of said smart card support to said body and insertion of said card within said receiving compartment.

2. A combination of a housing device and a smart card according to claim 1, wherein the electrical connection means comprise deflectable resilient contacts, mounted to the interior of said body facing said smart card and in contact therewith.

3. A combination of a housing device and an electronic smart card comprising a body defining a receiving compartment for receiving said smart card, a support, said card being permanently fixed to said support, means for temporary mounting the support to said body with said smart card movable into said receiving compartment such that said receiving compartment defining body constitutes a storage case for said electronic smart card.

4. Housing device for a smart card having contacts, said device comprising a body defining a receiving compartment for receiving said smart card, a support, said card being permanently fixedly mounted to said support, means for temporarily mounting said support to said body with said card inserted within said receiving compartment, said receiving compartment comprising part of an apparatus including at least one electronic circuit adapted to operate in relation with said smart card, and said body defining said receiving compartment including electrical connection means for connecting the contacts of the smart card to said electronic circuit upon mounting of said smart card support to said body and insertion of said card within said receiving compartment, and wherein said support is a flat part and said smart card is fixed to one of major sides of said flat part.

5. Housing device for a smart card having contacts, said device comprising a body defining a receiving compartment for receiving said smart card, a support, said card being permanently fixedly mounted to said support, means for temporarily mounting said support to said body with said card inserted within said receiving compartment, said receiving compartment comprising part of an apparatus including at least one electronic circuit adapted to operate in relation with said smart card, and said body defining said receiving compartment including electrical connection means for connecting the contacts of the smart card to said electronic circuit upon mounting of said smart card support to said body and insertion of said card within said receiving compartment, and wherein said support is a part integral with the smart card at one end of said smart card.

6. Housing device for a smart card comprising a wallet-like holder having retained at one end in said wallet-like holder, a smart card support of U-shaped cross-section having a pair of arms, one of which is much shorter than the other, a space between the arms constituting a slot acting as a receiving compartment for said smart card, and wherein a pivot pin passing through said arms and an end of said wallet holder remote from said smart card, mounts said wallet-like holder for pivoting to said U-shaped support at one end thereof, whereby the wallet holder in swinging about said pivot pin causes the smart card to enter said slot for storage purposes or to be extracted from the slot during use of the smart card.

7. Housing device according to claim 3; wherein said means for temporarily mounting the support to the receiving compartment defining body comprises snap-in elements on facing sides of said support, snap engaged with respective facing sides of said compartment defining body.

* * * * *